Figure 1:
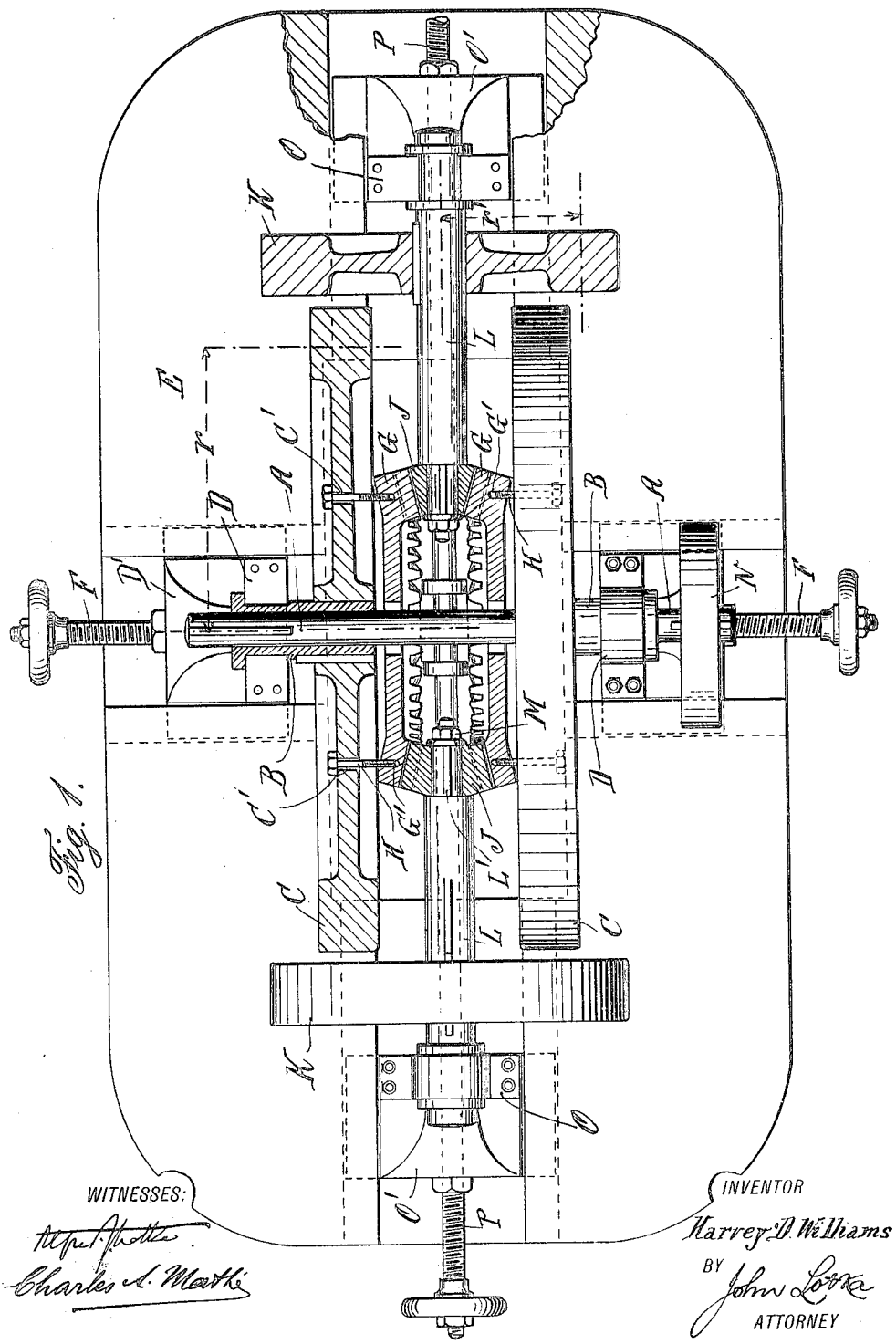

H. D. WILLIAMS.
MEANS FOR PERFECTING TOOTHED GEARS.
APPLICATION FILED MAR. 3, 1915.

1,335,472.

Patented Mar. 30, 1920.
2 SHEETS—SHEET 1.

WITNESSES:

INVENTOR
Harvey D. Williams
BY
John Looka
ATTORNEY

H. D. WILLIAMS.
MEANS FOR PERFECTING TOOTHED GEARS.
APPLICATION FILED MAR. 3, 1915.
1,335,472.
Patented Mar. 30, 1920.
2 SHEETS—SHEET 2.
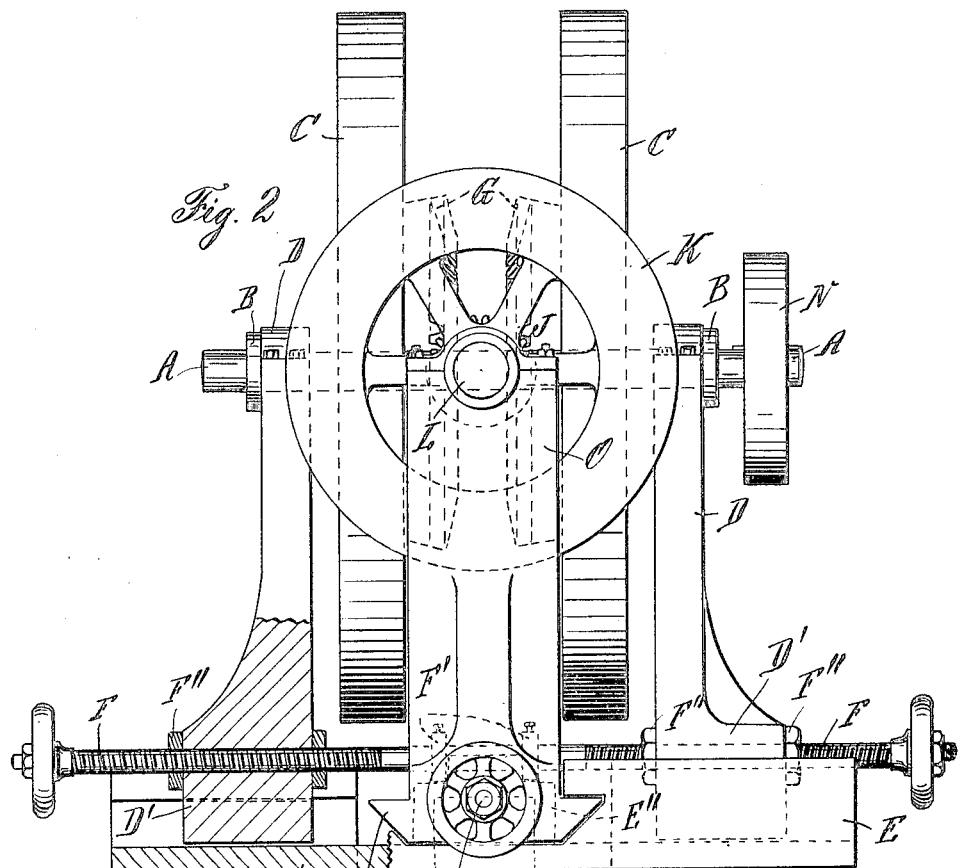
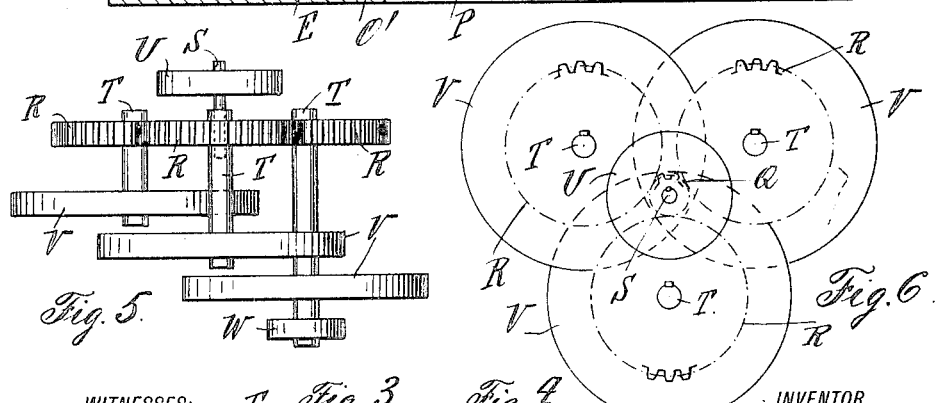
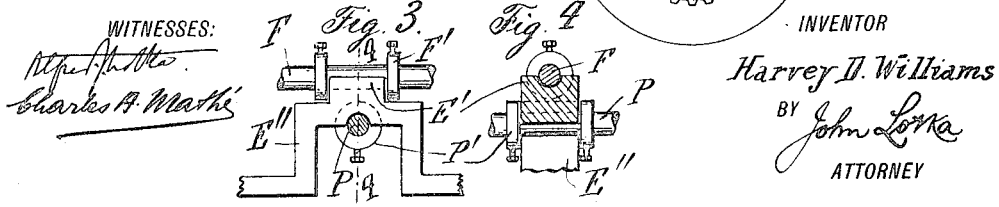
INVENTOR
Harvey D. Williams
BY John Lorka
ATTORNEY
WITNESSES:

UNITED STATES PATENT OFFICE.

HARVEY D. WILLIAMS, OF WALLINGFORD, CONNECTICUT, ASSIGNOR TO GEAR IMPROVEMENT COMPANY, INC., OF NEW YORK, N. Y., A CORPORATION OF NEW YORK.

MEANS FOR PERFECTING TOOTHED GEARS.

1,335,472.      Specification of Letters Patent.      Patented Mar. 30, 1920.

Application filed March 3, 1915. Serial No. 11,888.

*To all whom it may concern:*

Be it known that I, HARVEY D. WILLIAMS, a citizen of the United States, and resident of Wallingford, in the county of New Haven and State of Connecticut, have invented certain new and useful Improvements in Means for Perfecting Toothed Gears, of which the following is a specification.

My invention relates to the manufacture of toothed gears of various types, and has for its object to reduce materially the time and labor required for the production of toothed gears of high precision. I may take toothed gears that are only roughly formed, and by my invention convert them in a short time, and without requiring any skilled labor, into gears having the proper conjugate shape of tooth surfaces and of a high degree of precision so as to insure their smooth and noiseless operation. Even when the gears have been cut carefully, their qualities are improved by treating them according to this invention.

In carrying out my invention, I place the gears to be perfected, in mesh with each other, and connect them in a practically rigid fashion with fly-wheels, so that when the meshing gears are rotated, the fly-wheels will turn with them, and the kinetic energy imparted to the said fly-wheels will cause a wearing down of any inequalities of the meshing tooth surfaces, so as to give them a conjugate shape of high precision. The best results are obtained when the fly-wheels are of like kinetic energy. With this procedure, the meshing gear teeth will be given the proper conjugate form in a relatively short time.

Two forms of apparatus suitable for carrying out my present invention are shown in the accompanying drawings, in which Figure 1 is a plan view (with parts in section) of an apparatus for perfecting bevel gears according to my invention; Fig. 2 is a front elevation of such apparatus, with parts in section; Fig. 3 is a detail elevation of a portion at the center of the machine; Fig. 4 is a vertical section substantially on line 4—4 of Fig. 3; Fig. 5 is a bottom plan view, and Fig. 6 an elevation of an apparatus for perfercting spur gears according to my invention.

In the apparatus illustrated by Figs. 1 to 4, a shaft or axial support A extends through two spaced rotatable members or sleeves B keyed to or otherwise connected rigidly with, fly-wheels C. The sleeves B are supported in any suitable manner, as by means of bearings D, which may be adjustable in a direction parallel with the axis of said sleeves; for this purpose, the bearings D may be moved along the base plate E by means of a screw F having oppositely threaded portions passing through slides D' rigid with said bearings. The screw F is normally held against longitudinal movement in any suitable manner, as by means of collars F' fastened by set-screws and engaging a stationary stop E' provided at the central portion of the machine. If it is desired to positively lock the screw F against turning after the adjustment of the slides D', this may be accomplished in any suitable manner, as by means of nuts F''. In the particular construction shown, one of the sleeves B is fast on the shaft A; in this case, the other sleeve B must be free to turn on the shaft; in any event, the two sleeves B should be capable of turning relatively to each other in opposite directions. Each of the fly-wheels is provided with suitable means for connecting it in a substantially rigid manner with a toothed bevel wheel or blank G, the two bevel wheels G being of the same diameter. As a connecting means, I have shown screws H passing loosely through openings C' in the fly-wheels C and screwing into suitable openings G' in the wheels G. The two wheels G are placed in mesh with bevel pinions J at diametrically opposite points, that is to say, at opposite sides of the axis about which the fly-wheels C and wheels G are mounted to rotate. These pinions J are secured in a substantially rigid manner to fly-wheels K, as by means of shafts L to which the said fly-wheels are secured rigidly, and of keys L' and nuts M for holding the pinions on said shaft. Rotation may be imparted to the entire system of fly-wheels and meshing gears in any suitable manner, as by means of a belt-pulley N on the shaft A. The two alining shafts L are supported in bearings O, which may be adjustable lengthwise, as by a screw P and slides O' of the same character as described above with reference to the screw F and slides D'. That is to say, the screw P has oppositely threaded portions working in correspondingly threaded openings of the slides O', and on the central portion of said screw collars P', held by set screws, are located in engagement with the stationary frame portion E'', which may be rigid or integral with the base plate E. Both the stop E' and the frame portion E'' are shown provided with bearings or seats for the central portions of the screws F and P respectively. It will be obvious that the shafts L will rotate in opposite directions, and similarly, that the sleeves B with their fly-wheels will also rotate in opposite directions. The wheels G, owing to their engagement with the pinions J at opposite sides, also form supports for the inner ends of the shafts L.

In order to obtain the best results, the kinetic energy should be the same for each of the fly-wheels C, K. That is to say, if $w$ indicates the weight of the fly-wheel C (or rather of its rim, since the remaining portion of the fly-wheel may generally be disregarded), $r$ the radius of said wheel, and $n$ the number of its revolutions per unit of time, and if $w'$, $r'$, and $n'$ have a corresponding meaning with reference to the fly-wheel K, then, to obtain the best results, the dimensions of the parts should be selected so as to satisfy the equation $$wr^2n^2 = w'(r')^2(n')^2.$$

In the particular example illustrated by Figs. 1 to 4, the ratio of gearing between the pinions J and the wheels G, is as 1:4, that is to say, $n' = 4n$. Under these conditions, and assuming further that (as shown) the cross sectional area of the rim is the same for the fly-wheels C and K, the equation given above will be satisfied by making $r = 2r'$, as indicated in Fig. 1. By selecting the dimensions according to this formula, so as to obtain an equal kinetic energy for the several fly-wheels, I insure an equal action and reaction at each of the meshing gears, and therefore the most uniform and efficient results.

As will be understood readily, the operation is based on the fact that any inequalities in the meshing tooth surfaces will tend to advance or retard the meshing gears and thus to give them an irregular speed of rotation, but the kinetic energy of the rotating fly-wheels, tending to keep them in motion at a uniform rate of speed, will act powerfully on such imperfect portions of the tooth surfaces and will wear down such inequalities in a very short time, so as to give the tooth surfaces a conjugate shape of high precision. The teeth subjected to this operation may be of a very rough and inexact shape (for instance, such as results from casting), or teeth of better shape (say, milled teeth) may be treated according to my invention in order to "perfect" them in a very short time and without great cost, since neither expensive machinery nor skilled labor is required for carrying out this invention.

If the machine or apparatus is intended for just one size of gears G, J, the means for adjusting the sleeves B and the shafts L lengthwise (that is, the slides D', O' and coöperating parts) may be dispensed with. As long as the gearing ratio is the same, the same fly-wheels C, K may be used; thus, the fly-wheels shown in the drawing will do in all cases where the gearing ratio of pinion and wheel is as 1:4. If a different ratio occurs, it will be necessary, in order to obtain the best results, to change one set of fly-wheels or both, so as to satisfy the equation given above, $$wr^2n^2 = w'(r')^2(n')^2.$$

In Figs. 5 and 6, the spur pinion Q to be perfected is in mesh with three spur wheels R to be perfected, said wheels being located symmetrically with reference to the pinion Q. The shafts S, T carrying said pinion and wheels respectively are parallel and are provided with fly-wheels U, V respectively, rigidly connected with the respective gears. A pulley W or any other suitable device serves for rotating the system of meshing gears Q, R. Any suitable means are employed for securing the gears to the respective shafts so as to connect said gears in a substantially rigid manner with their fly-wheels U, V. The operation and advantages of this form of my invention are the same as in the case of the construction shown in Figs. 1 to 4. In each of these constructions, there is a toothed gear and a plurality of gears in mesh with it, and located symmetrically with reference thereto. It will be understood that the formula $$wr^2n^2 = w'(r')^2(n')^2$$

is to be observed in both forms of my invention, if the best results are to be obtained. The symmetrical arrangement referred to above is for the purpose of avoiding one-sided strains on the shafts and insuring conditions under which the entire kinetic energy of the rotating fly-wheels (or practically so) will be utilized for the "perfecting" of the meshing gears in the manner described.

Various modifications may be made without departing from the nature of my invention as set forth in the appended claims.

I claim as my invention:

1. The combination of a toothed gear, a plurality of gears in mesh with the first-named gear, and fly-wheels connected rigidly with the several gears.

2. The combination of two bevel wheels mounted to turn in opposite directions about the same axis, two axially-alined bevel pinions in mesh with both of said wheels at diametrically opposite points thereof, and fly-wheels connected with the said wheels and pinions.

3. The combination of two bevel wheels mounted to turn in opposite directions about the same axis, an axial support common to both wheels, two axially-alined bevel pinions mounted to turn in opposite directions and in mesh with both of said wheels at diametrically opposite points thereof, and individual fly-wheels connected with the several wheels and pinions.

4. The combination of two fly-wheels mounted to turn about different axes and provided with means for connecting them rigidly with meshing toothed gears.

5. The combination of two fly-wheels mounted to turn in opposite directions about the same axis, and two additional fly-wheels, located on opposite sides of said axis and mounted to turn in opposite directions about an axis perpendicular to the first-named axis, the said fly-wheels being provided with means for connecting them rigidly with meshing toothed gears.

In testimony whereof, I have signed this specification in the presence of two subscribing witnesses.

HARVEY D. WILLIAMS.

Witnesses:
NORMAN DIXON,
WILLIAM R. DUNN.